United States Patent
Sotosek et al.

(10) Patent No.: US 12,510,958 B2
(45) Date of Patent: Dec. 30, 2025

(54) COMPUTING SYSTEM WITH MOTION-DETECTING DEVICE CONFIGURATION FEATURE

(71) Applicant: The Nielsen Company (US), LLC, New York, NY (US)

(72) Inventors: Igor Sotosek, Koper (SI); Girish Khavasi, Lake Hiawatha, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/777,193

(22) Filed: Jul. 18, 2024

(65) Prior Publication Data

US 2025/0028384 A1   Jan. 23, 2025

Related U.S. Application Data

(60) Provisional application No. 63/514,447, filed on Jul. 19, 2023.

(51) Int. Cl.
*G06Q 30/02* (2023.01)
*G06F 3/01* (2006.01)

(52) U.S. Cl.
CPC .................... *G06F 3/011* (2013.01)

(58) Field of Classification Search
CPC ...................................... G06F 3/011
USPC .......................................... 702/158
See application file for complete search history.

(56) References Cited

U.S. PATENT DOCUMENTS

2015/0142689 A1* 5/2015 Squires ................. G06Q 50/01
   702/158
2018/0064388 A1* 3/2018 Heneghan ............. A61B 5/743

* cited by examiner

*Primary Examiner* — Abdul-Samad A Adediran
(74) *Attorney, Agent, or Firm* — McDonnell Boehnen Hulbert & Berghoff LLP

(57) ABSTRACT

An example method is for use in connection with a media device and a motion-detecting device mounted to the media device, and includes: obtaining motion data associated with the motion-detecting device; providing the obtained motion data to a trained classifier, wherein the trained classifier is configured to use at least motion data as runtime input data to generate at least device type data as runtime output data; responsive to providing the obtained motion data to the trained classifier, receiving from the trained classifier corresponding device type data generated by the trained classifier; using at least the received device type data to identify a device type of the media device; using at least the identified device type of the media device as a basis to select a set of configuration parameters for the motion-detecting device; and causing the motion-detecting device to be configured according to the selected set of configuration parameters.

20 Claims, 6 Drawing Sheets

COMPUTING SYSTEM WITH MOTION-DETECTING DEVICE CONFIGURATION FEATURE

PRIORITY

This disclosure claims priority to U.S. Provisional Pat. App. No. 63/514,447 filed Jul. 19, 2023, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method is for use in connection with a media device and a motion-detecting device mounted to the media device. The method includes (i) obtaining motion data associated with the motion-detecting device; (ii) providing the obtained motion data to a trained classifier, wherein the trained classifier is configured to use at least motion data as runtime input data to generate at least device type data as runtime output data; (iii) responsive to providing the obtained motion data to the trained classifier, receiving from the trained classifier corresponding device type data generated by the trained classifier; (iv) using at least the received device type data to identify a device type of the media device; (v) using at least the identified device type of the media device as a basis to select a set of configuration parameters for the motion-detecting device; and (vi) causing the motion-detecting device to be configured according to the selected set of configuration parameters.

In another aspect, an example computing system is disclosed. The computing system includes a processor and a non-transitory computer-readable medium having stored thereon program instructions that upon execution by the processor, cause performance of a set of acts for use in connection with a media device and a motion-detecting device mounted to the media device. The set of acts includes (i) obtaining motion data associated with the motion-detecting device; (ii) providing the obtained motion data to a trained classifier, wherein the trained classifier is configured to use at least motion data as runtime input data to generate at least device type data as runtime output data; (iii) responsive to providing the obtained motion data to the trained classifier, receiving from the trained classifier corresponding device type data generated by the trained classifier; (iv) using at least the received device type data to identify a device type of the media device; (v) using at least the identified device type of the media device as a basis to select a set of configuration parameters for the motion-detecting device; and (vi) causing the motion-detecting device to be configured according to the selected set of configuration parameters.

In another aspect, a non-transitory computer-readable medium is disclosed. The non-transitory computer-readable medium has stored thereon program instructions that upon execution by a processor, cause performance of a set of acts for use in connection with a media device and a motion-detecting device mounted to the media device. The set of acts includes (i) obtaining motion data associated with the motion-detecting device; (ii) providing the obtained motion data to a trained classifier, wherein the trained classifier is configured to use at least motion data as runtime input data to generate at least device type data as runtime output data; (iii) responsive to providing the obtained motion data to the trained classifier, receiving from the trained classifier corresponding device type data generated by the trained classifier; (iv) using at least the received device type data to identify a device type of the media device; (v) using at least the identified device type of the media device as a basis to select a set of configuration parameters for the motion-detecting device; and (vi) causing the motion-detecting device to be configured according to the selected set of configuration parameters.

DETAILED DESCRIPTION

I. Overview

Figure 1:
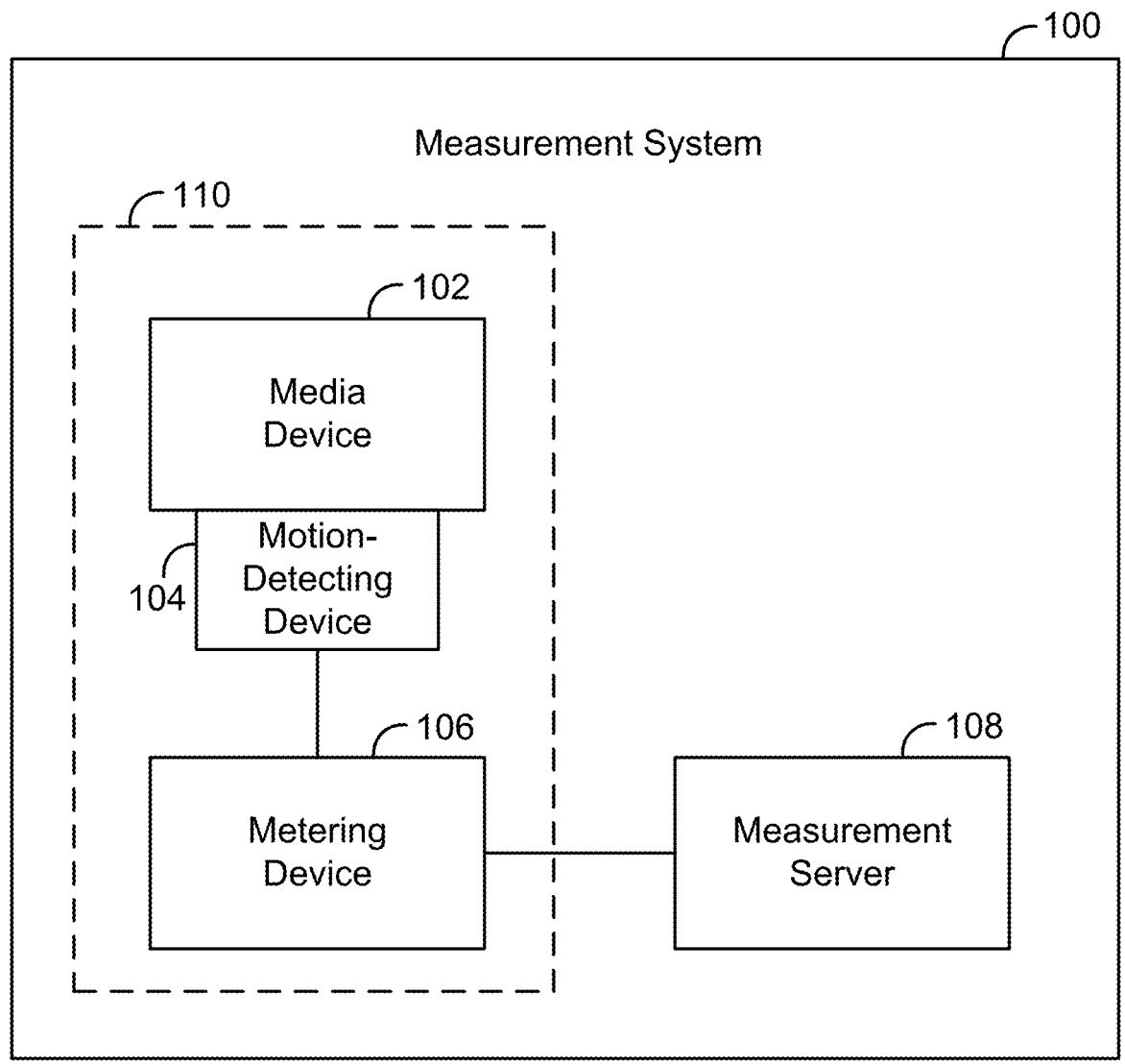
FIG. 1 is a simplified block diagram of an example measurement system in which various described principles can be implemented.

A measurement system can perform operations related to audience measurement in connection with the presentation and/or consumption of media content. In one aspect, this can involve the measurement system using one or more media content identification techniques to identify what media content is being presented to, and/or consumed by, a user and when that is occurring. The measurement system can use various techniques to do this. For example, the measurement system can include a metering device positioned near a television or other media-presentation device of a user, such that the metering device can be exposed to audio output by a speaker of the television. The metering device can then extract a watermark embedded in an audio component of the presented media content, and/or generate a fingerprint from the presented media content, and can use the watermark or fingerprint as a basis to identify that media content. Other media content identification techniques are possible as well, including for example, video-based watermarking or fingerprinting techniques, or techniques that involve data packet inspection of a signal carrying the media content.

In addition to or instead of identifying the media content that is being presented and/or consumed, in some situations in might be advantageous to detect which particular device the user is using in connection with the presentation and/or computing of that media content. In other words, it can be useful to detect user activity associated with a media given. This can be useful for a variety of reasons. As one example, this can allow the measurement system to infer a content platform that the user is using, which can allow the measurement system to provide more accurate and complete audience measurement information.

Disclosed herein are techniques that can provide these and other benefits. In one aspect, the disclosure involves a measurement system performing operations related to configuring a motion-detecting device (which can include various components, such as an accelerometer) mounted on a media device, such as a television or set-top box remote controller, a video game system controller, or a wearable audio output device. This can allow the motion-detecting device to efficiently gather relevant motion data for that media device, which the measurement system can then use to detect user activity associated with that media device.

Notably though, in some scenarios, this approach can introduce some challenges and/or drawbacks. For example, this approach can result in the motion-detecting device needing to transmit a large amount of motion data to the measurement server (e.g., directly or by way of an intermediary metering device), which can be computationally and/or resource intensive. Related to this, in the case where the motion-detecting device is battery powered, such activity can drain the battery faster than may be desired.

To help address these and other issues, in one aspect, the measurement system can configure the motion-detecting device for detecting user activity for that particular media device (i.e., for a media device of that type). Among other things, this can allow the motion-detecting device to itself conduct some on-device data filtering, data smoothing, and/or data processing, such that it can more efficiently and effectively generate and transmit motion data for use by the measurement server or another device.

In one aspect, the measurement system can employ a technique that involves configuring the motion-detecting device using an automatic, classifier-based configuration technique. More specifically, according to one example implementation, this technique can involve (i) obtaining motion data associated with the motion-detecting device; (ii) providing the obtained motion data to a trained classifier, wherein the trained classifier is configured to use at least motion data as runtime input data to generate at least device type data as runtime output data; (iii) responsive to providing the obtained motion data to the trained classifier, receiving from the trained classifier, corresponding device type data generated by the trained classifier; (iv) using at least the received device type data to identify a device type of the media device; (v) using at least the identified device type of the media device as a basis to select a set of configuration parameters for the motion-detecting device; and (vi) causing the motion-detecting device to be configured according to the selected set of configuration parameters.

Among other things, this can allow the motion-detecting device to then process motion data on-device and output activity data (indicating activity on and off events), rather than needing to provide more detailed motion data.

These and related operations, systems, and features will now be describe in greater detail.

II. Example Architecture

A. Content System

FIG. 1 is a simplified block diagram of an example measurement system 100. Generally, the measurement system 100 can perform operations related to audience measurement in connection with the presentation and/or consumption of media content. In one aspect, this can involve the measurement system 100 performing operations related to configuring a motion-detecting device mounted on a media device. This can allow the motion-detecting device to efficiently gather relevant motion data, which the measurement system 100 can then use to detect user activity associated with the media device, which can be useful for various reasons, such as to improve accuracy in the context of audience measurement. In one example, detecting user activity of a media device can allow the measurement system to infer a content platform that the user is using and/or watching.

Detecting user activity can also be useful for other reasons. For example, in the case where a user is consuming media that includes video and audio, but the user is listening to the audio portion using headphones (rather than speakers), this can be useful for the measurement system 100 to determine, as ordinarily the lack of speaker audio being detected by a metering device of the measurement system 100 may suggest that there is some technical malfunction occurring. However, in this case, if the measurement system 100 determines that the user is using headphones, which may likely explain the lack of speaker audio in this scenario, the measurement system 100 might avoid performing troubleshooting steps that it might otherwise perform.

Returning to the measurement system 100, this can include various components, such as a media device 102, a motion-detecting device 104, a metering device 106, and a measurement server 108. The measurement system 100 can also include one or more connection mechanisms that connect various components within the measurement system 100. For example, the measurement system 100 can include the connection mechanisms represented by lines connecting components of the measurement system 100 as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, a communication (e.g., a transmission or receipt of data) can be a direct or indirect communication.

The media device 102 can take various forms and/or can include various components. For instance, the media device 102 can be or include a media-presentation device, such as a television, set-top box, video game system, mobile phone, tablet, laptop, or head-mountable display device, or various combinations thereof, among other possibilities. Additionally or alternatively, the media device 102 can be or include a controller or accessory configured for use in connection with a media-presentation device. For example, the media device 102 can be or include a television or set-top box remote controller, a video game system controller, or a wearable audio output device (e.g., headphones or earbuds).

Media content can be or include video content and/or audio content. Media content can be represented by media data (e.g., video and/or audio data), which can be generated, stored, and/or organized in various ways and according to various formats and/or protocols (e.g., in MPEG-4 format), using any related techniques now known or later discovered.

The motion-detecting device 104 can take various forms and/or can include various components. For example, the motion-detecting device 104 can include a motion sensor that allows the motion-detecting device 104 to obtain motion data and to detect motion. In one example, the motion-detecting device 104 can be or include an accelerometer that obtains motion data representative of acceleration across one or more axes of movement. In other examples, the motion-detecting device 104 can include a compass or another component that can obtain motion data and detect motion.

In various examples, the motion-detecting device 104 can also include other components, such as a wireless transceiver (to allow the motion-detecting device 104 to communicate with a device such as the metering device 106), a processor, a data-storage unit, a battery or other power source, and/or other components, such as components of a computing system 200, as described below. In various examples, the motion-detecting device 104 can be configured to operate in various ways in accordance with various configuration parameters and/or in various modes, such as according to the examples described in this disclosure.

The motion-detecting device 104 can also include a mounting component (e.g., an adhesive strip or fastener) that allows the motion-detecting device 104 to be mounted to the media device 102 (additionally or alternatively, a mounting component can be part of the media device). In this way, the motion-detecting device 104 can move together with the media device 102, and thus the motion data generated by the motion-detecting device 104 can represent motion of both the motion-detecting device 104 and the media device 102 and thus, can also represent user activity of a user using the media device 102.

The metering device 106 can perform various metering/measurement operations using any measurement technique now known or later discovered. For example, the metering device 106 can obtain and use video and/or audio fingerprints or watermarks, and/or can obtain data using various packet-inspection techniques or the like, to identify media content being presented by the media device 102 or by a media-presentation device connected to or otherwise associated with the media device 102. The metering device 106 can also transmit measurement data to the measurement server 108, which can use the measurement data for audience measurement reporting or other purposes.

The metering device 106 can also facilitate communication between the motion-detecting device 104 and the measurement server 108, such as by obtaining motion data from the motion-detecting device 104 and transmitting it to the measurement server 108. Additionally or alternatively, the metering device 106 can cause the motion-detecting device 104 to operate in accordance with one or more configuration parameters, such as by transmitting a suitable instruction to the motion-detecting device 104.

The measurement server 108 can thus receive data such as motion data and/or other measurement data from the metering device 106 and/or from another component of the measurement system 100. Additionally or alternatively, the measurement server 108 can cause the motion-detecting device 104 to be configured to operate in accordance with one or more configuration parameters, such as by transmitting a suitable instruction to the metering device 106, which in turn transmits a suitable instruction to the motion-detecting device 104.

In some instances, the media device 102, the motion-detecting device 104, and the metering device 106 may all be located with a customer premises area 110 (e.g., within a user's home), and the measurement server 108 may be remotely located from that customer premises area 110.

In some cases, the measurement system 100 can include multiple instances of at least some of the described components. For example, in practice, the measurement system 100 is likely to include multiple media devices 102, each having a respective motion-detecting device 104 mounted to it, with all being located within the same customer premises area 110.

The measurement system 100 and/or components thereof can take the form of a computing system, an example of which is described below.

B. Computing System

Figure 2:
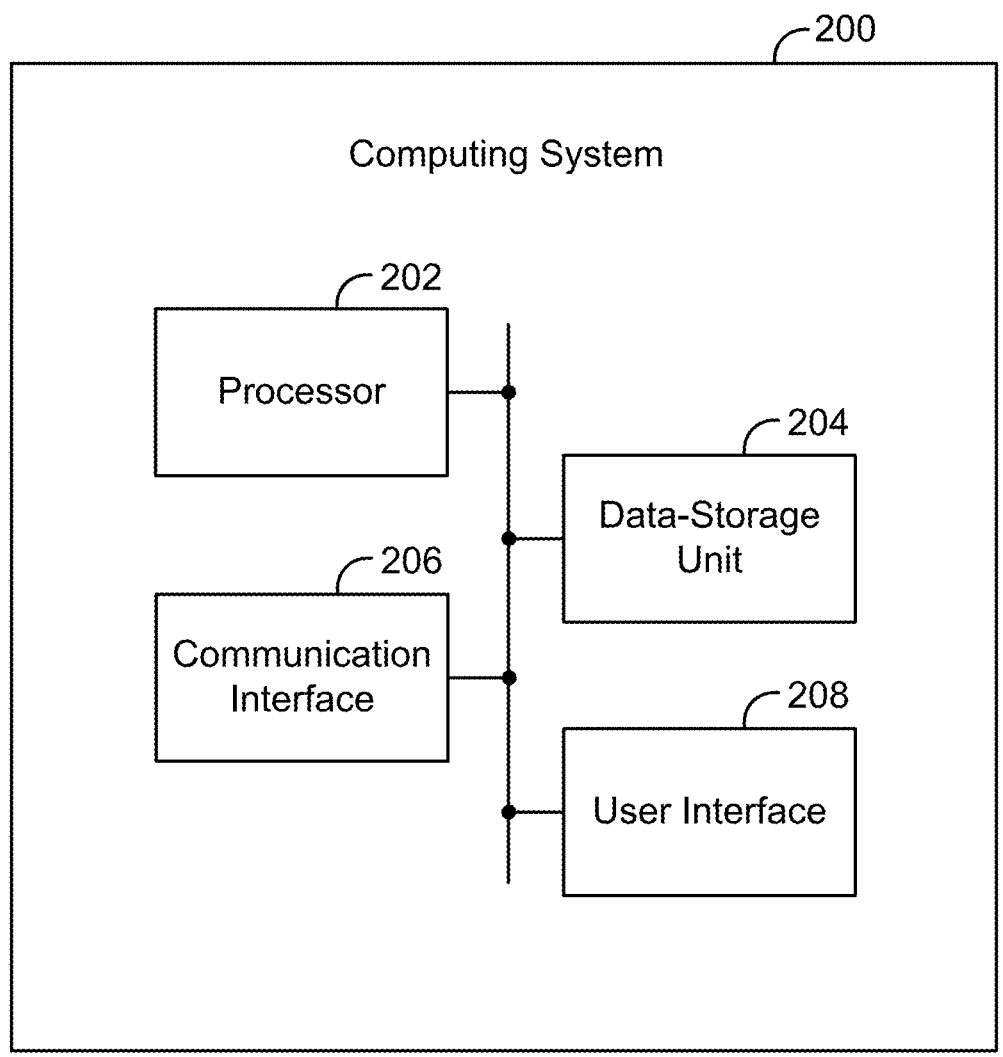
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface, a High-Definition Multimedia Interface (HDMI), or a Universal Serial Bus (USB) interface. In another example, the communication interface 206 can be or include a wireless interface, such as a cellular or Wi-Fi interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200 as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the measurement system 100 and/or components thereof can take the form of a computing system, such as the computing system 200. In some cases, some or all these entities can take the form of a more specific type of computing system, such as a desktop computer, a laptop, a tablet, a mobile phone, a television, a set-top box, a head-mountable display device (e.g., a virtual-reality headset or a augmented-reality headset), or various combinations thereof, among other possibilities.

III. Example Operations

The measurement system 100 and/or components thereof can be configured to perform and/or can perform one or more operations. As noted above, generally, the measurement system 100 can perform operations related to audience measurement in connection with the presentation and/or consumption of media content. However, the measurement system 100 can also perform other operations. Various example operations that the measurement system 100 can perform, and related features, will now be described with reference to various figures.

In one aspect, the measurement system 100 can use motion data obtained from the motion-detecting device 104, to detect user activity associated with the media device 102. In this context, the motion data can be or include raw motion data generated by the motion-detecting device 104 and/or motion feature data generated based on such raw motion data.

Raw motion data can take various forms. For example, the raw motion data can be or include an indication that motion has started or an indication that motion has stopped. The time period between the starting of motion and the stopping of motion is referred to in this disclosure as an activity pulse. A single activity pulse typically lasts for a short time period (e.g., a few milliseconds or a few seconds). In the case where the motion-detecting device 104 includes an accelerometer, the motion-detecting device 104 can output motion data indicating motion has started to indicate that there is detected acceleration on one or more axes and can output motion data indicating motion has stopped to indicate that acceleration is no longer detected, for example. The raw motion data could also take other forms, such as additionally or alternatively indicating a direction of motion, a degree of motion, etc. The raw motion data can also explicitly indicate the time period to which the starting or stopping of motion relates (e.g., with time stamps, etc.) or such a timing information can be implicit (e.g., based on when the motion data is generated, transmitted, etc.).

As noted above, the motion data can also be or include motion feature data generated based on such raw motion data. As such, the motion data can include data derived from raw motion data. In some examples, the motion feature data can take the form of a motion feature vector that includes one or more motion features derived from the raw motion data.

There can be various different motion features, three non-limiting examples of which will be identified and then discussed in the context of certain types of media devices and related user activity. A first example motion feature can specify a duration of an activity pulse. A second example motion feature can specify an extent of whether activity pulses are distributed as solitary events as compared to groups of events. And finally, a third motion feature can specify an extent of whether activity pulses are distributed over a viewing/listening session regularly as compared to sporadically.

As noted above, the measurement system 100 can use motion data obtained from the motion-detecting device 104, to detect user activity associated with the media device 102. Detecting user activity in this way stems from a recognition that for a given type of media device, user activity associated with that device tends to be represented by motion data having certain characteristics specific to that type of media device.

For example, consider a media device 102 that takes the form of a television or set-top box remote controller. For such a media device 102, user activity associated with the media device 102 may tend to be represented by one or more of the following motion data characteristics in the context of the example motion feature vectors discussed above. First, the motion data is likely to include predominantly short activity pulses. Second, the motion data is likely to include predominately solitary activity pulses. Third, the motion data is likely to include activity pulses sporadically distributed over the viewing/listening session. Collectively, these characteristics may represent common ways in which users tend to interact with such television and/or set-top box remote controllers, because users tend to provide occasional commands to change the channel/volume, for example.

As another example, consider a media device 102 that takes the form of a video game system controller. For such a media device 102, user activity associated with that media device 102 may tend to be represented by one or more of the following motion data characteristics in the context of the example motion feature vectors discussed above. First, the motion data is likely to include predominantly long activity pulses. Second, the motion data is likely to include predominately grouped activity pulses. Third, the motion data is likely to include activity pulses distributed regularly (and at a high density) over the viewing/listening session. Collectively, these characteristics may represent common ways in which users tend to interact with such video game system controllers, because users tend to fairly consistently operate the controller as they play a game, for example.

As still another example, consider a media device 102 that takes the form of a wearable audio output device, such as headphones. For such a media device 102, user activity associated with that media device 102 may tend to be represented by one or more of the following motion data characteristics in the context of the example motion feature vectors discussed above. First, the motion data is likely to include a medium level of activity pulses. Second, the motion data is likely to include a medium number of activity pulses within the viewing/listening session. Third, the motion data is likely to include activity pulses distributed regularly over the viewing/listening session. Collectively, these characteristics may represent common ways in which users tend to interact with such wearable audio output devices, because users tend to somewhat consistently turn their head while listening to audio (typically more often than they would move a television or set-top box controller, but less often that they would move a video game system controller).

Figure 3:
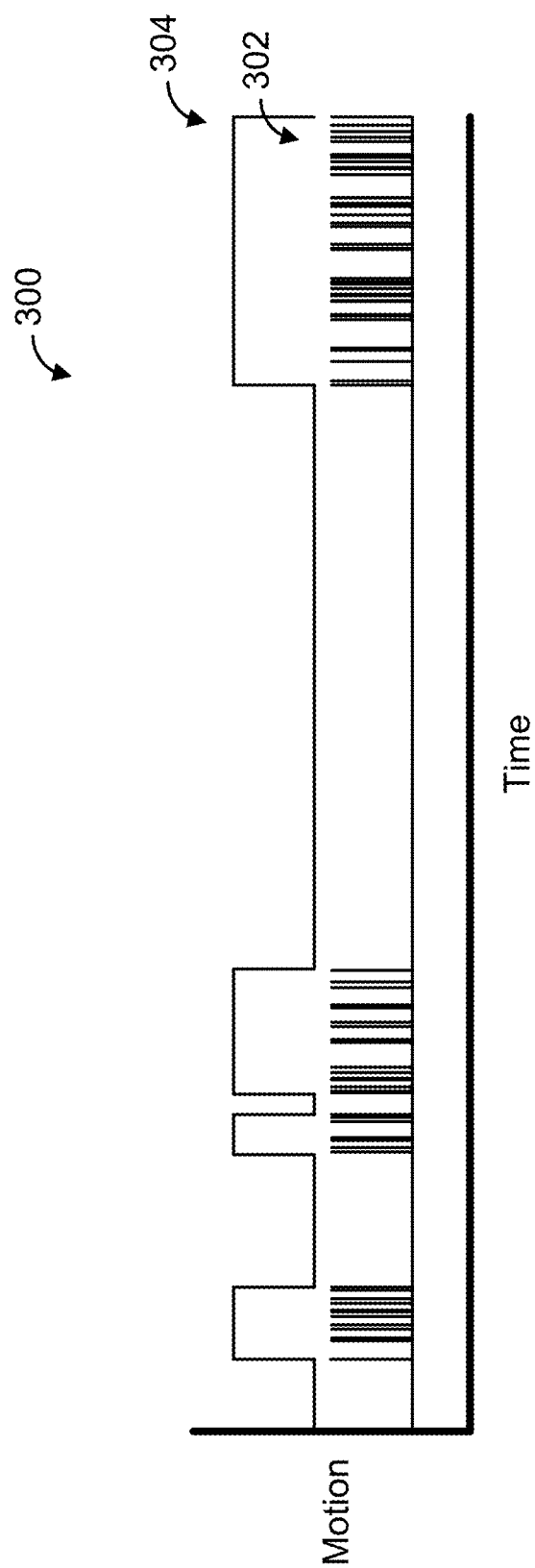
FIG. 3 is a graph of motion data associated with a wearable audio output device, according to one example.

FIG. 3 depicts a graph 300 of motion data associated with a wearable audio output device, according to one example, and helps illustrate this concept. As shown in the graph 300, the X-axis represents time and the Y-axis represents motion. In the plot area, the lower data 302 represents raw motion data generated by a motion-detecting device mounted to the wearable audio output device and the upper data 304 represent a corresponding user activity signal to provide a higher-level, smoothed out indication as to whether the wearable audio output device is being used by a user. For the sake of clarity, the data 304 is shifted up above the data 302 (so as to avoid the data appearing jumbled). Note that in the situation where the media device 102 takes the form of a television or set-top box remote controller (as discussed above), a video game system controller (as also discussed above), or another device, a similar type of graph could illustrate these same concepts, but with data associated with that type of device, of course.

As noted above, in one aspect, the measurement system 100 can use motion data obtained from the motion-detecting device 104, to detect user activity associated with the media device 102. As one approach, this can include the motion-detecting device 104 obtaining and transmitting motion data to the measurement server 108 (perhaps by way of the metering device 106), and the measurement server 108 then receiving and analyzing the motion data to detect user activity associated with the media device 102.

Notably though, in some scenarios, this approach can introduce some challenges and/or drawbacks. For example, this approach can result in the motion-detecting device 104 needing to transmit a large amount of motion data to the measurement server 108, which can be computationally and/or resource intensive. Related to this, in the case where the motion-detecting device 104 is battery powered, such activity can drain the battery faster than may be desired.

To help address these and other issues, in one aspect, the measurement system 100 can configure the motion-detecting device 104 for detecting user activity for that specific media device (i.e., for a media device of that type). Among other things, this can allow the motion-detecting device 104 to itself conduct some on-device data filtering, data smoothing, and/or data processing, such that it can more efficiently and effectively generate and transmit motion data for use by the measurement server 108 or another device.

The measurement system 100 can configure the motion-detecting device 104 in various ways. As one approach, this can involve a user (e.g., a field representative tasked with configuring the motion-detecting device 104 and/or performing other configuration-related tasks) manually configuring the motion-detecting device 104. In one aspect, this can involve the user mounting the motion-detecting device 104 to the media device 102 (if it has not already been mounted) and using a configuration application (e.g., in the form of an mobile or web-based app) to associate the motion-detecting device 104 with the media device 102 and to configure the motion-detecting device 104 specifically for tracking motion of the media device 102 (i.e., for a media device of that type). In one example, this could involve the user analyzing motion data obtained from the motion-detecting device 104 and configuring the media device 102 with an appropriate set of configuration parameters that allow the motion-detecting device 104 to efficiently generate and transmit relevant motion data.

For example, one approach could involve a user specifying a set of configuration parameters that specifies that, rather than outputting all obtained raw motion data, the motion-detecting device 104 outputs a filtered and/or smoothed portion of the raw motion data and/or uses the raw motion data to generate and output derivative motion data based on the raw motion data. For example, referring back to FIG. 3, rather than the motion-detecting device 104 outputting motion data indicating each of the activity pulses represented in the lower data 302, the motion-detecting device 104 could instead output motion data indicating just a subset of those data points, such as just the activity pulses at the start end of time periods corresponding to user activity represented in the upper data 304. In this way, although the motion-detecting device 104 can obtain and process a large amount of motion data, it can transmit a relatively smaller amount of motion data, while still allowing the measurement server 108 to use that data to detect corresponding user activity of the media device 102.

In the context of filtering the motion data, various filtering and/or smoothing rules could be applied. In some examples, such filtering rules can correspond to the example motion feature data described above. For example, the motion-detecting device 104 could be configured such that, if an activity pulse is greater than a predefined duration, then the motion-detecting device 104 outputs an indication of activity on, whereas if an activity pulse is less than a predefined duration and there are fewer than a predefined number of activity pulses, then the motion-detecting device 104 outputs an indication of activity off, etc. These are just some examples. In practice, there could be a wide variety of different rules applied to suit a desired configuration.

Once configured with the set of configuration parameters, the motion-detecting device 104 can then obtain motion data in accordance with those configuration parameters, and can transmit the obtained motion data to the measurement server 108, which can use the motion data for various actions (e.g., related to audience measurement reporting, panel management, device management, etc.). The measurement server 108 can have access to the configuration application and related data such that the measurement server 108 can use the association between the identified media device 102 and the identified motion-detecting device 104 to associate the obtained motion data with the corresponding media device 102. In one aspect, the configuration application can execute on the measurement server 108, and can be remotely accessed/used by a user, such as by way of a mobile phone or other device that connects to the measurement server 108, but other arrangements are possible as well.

In some scenarios, the above-described approach of manually configuring the motion-detecting device 104 can introduce some challenges and/or drawbacks. For example, for a user to manually configure the motion-detecting device 104 in this way, the user may need to have a certain level of technical proficiency. Moreover, the manual configuration approach may also be complex and time-consuming.

To help address these and other issues, in another aspect, the measurement system 100 can configure the motion-detecting device 104 using an automatic, classifier-based configuration technique. This technique, along with related operations and features will now be described.

To begin, the measurement server 108 can obtain motion data associated with the motion-detecting device 104. In one example, this can involve the measurement server 108 receiving raw motion data from the motion-detecting device 104. The raw motion data can be generated by the motion-detecting device 104, in which case the obtained motion is the received raw motion data. In some examples, the motion-detecting device 104 can transmit such motion data to the metering device 106 (e.g., over a wireless connection), and the metering device 106 can in turn transmit the motion data to the measurement server 108, such that the measurement server 108 can receive the motion data.

In another example, the measurement server 108 obtaining motion data associated with the motion-detecting device 104 can involve the measurement server 108 (i) receiving raw motion data from the motion-detecting device 104, where the raw motion data was generated by the motion-detecting device, and (ii) using the received raw motion data to generate motion feature data, in which case the obtained motion data is the generated motion feature data.

In this context, the measurement server 108 can generate various different motion features, such as the various examples discussed above. As such, in one example, the measurement server 108 can generate motion data in the form of a motion feature vector that includes one or more of the following motion features: (i) a motion feature that specifies a duration of a activity pulse; (ii) a motion feature that specifies an extent of whether activity pulses are distributed as solitary events as compared to groups of events, or (iii) a motion feature that specifies an extent of whether activity pulses are distributed over a viewing/listening session regularly as compared to sporadically.

Next, the measurement server 108 can provide the obtained motion data (which can include raw motion data and/or derived motion data) to a trained classifier. The trained classifier can be configured to use at least motion data as runtime input data to generate at least device type data (which can, for example, identify a device type of a media device 102) as runtime output data.

Various different types of classifiers could be used for this purpose, including for example, classifiers trained using a deep neural network (DNN) and/or any other related machine learning techniques now known or later discovered. The classifier can be stored in, and/or executed from, a data-storage unit, such as a data-storage unit of the measurement server 108.

Before the measurement server 108 can use the classifier for this purpose, the measurement server 108 or another device can first train the classifier by providing it with training input data sets and training output data sets that parallel the runtime data sets described above, in a training phase. As such, the measurement server 108 can train the classifier by providing it with at least motion data as training input data and corresponding device type data (serving as ground truth data) as training output data. Once trained, the trained classifier can thus discriminate between different media device types based on motion data. As such, based on motion data associated with a given media device and received by the trained classifier, the trained classifier can determine whether the media device is a television or set-top box remote controller, a video game system controller, or a wearable audio output device, as an example.

In practice, it is likely that large amounts of training data perhaps thousands of training data sets associated with many different media devices from many different users-would be used to train the classifier as this generally helps improve the usefulness of the classifier. Such training data can be generated in various ways, including by being manually assembled. However, in some cases, the one or more tools or techniques, including any training data gathering or organization techniques now known or later discovered, can be used to help automate or at least partially automate the process of assembling training data and/or training the classifier. For these purposes, the measurement server 108 can use any machine learning technique, DNN, and/or classifier now known or later discovered.

Figure 5:
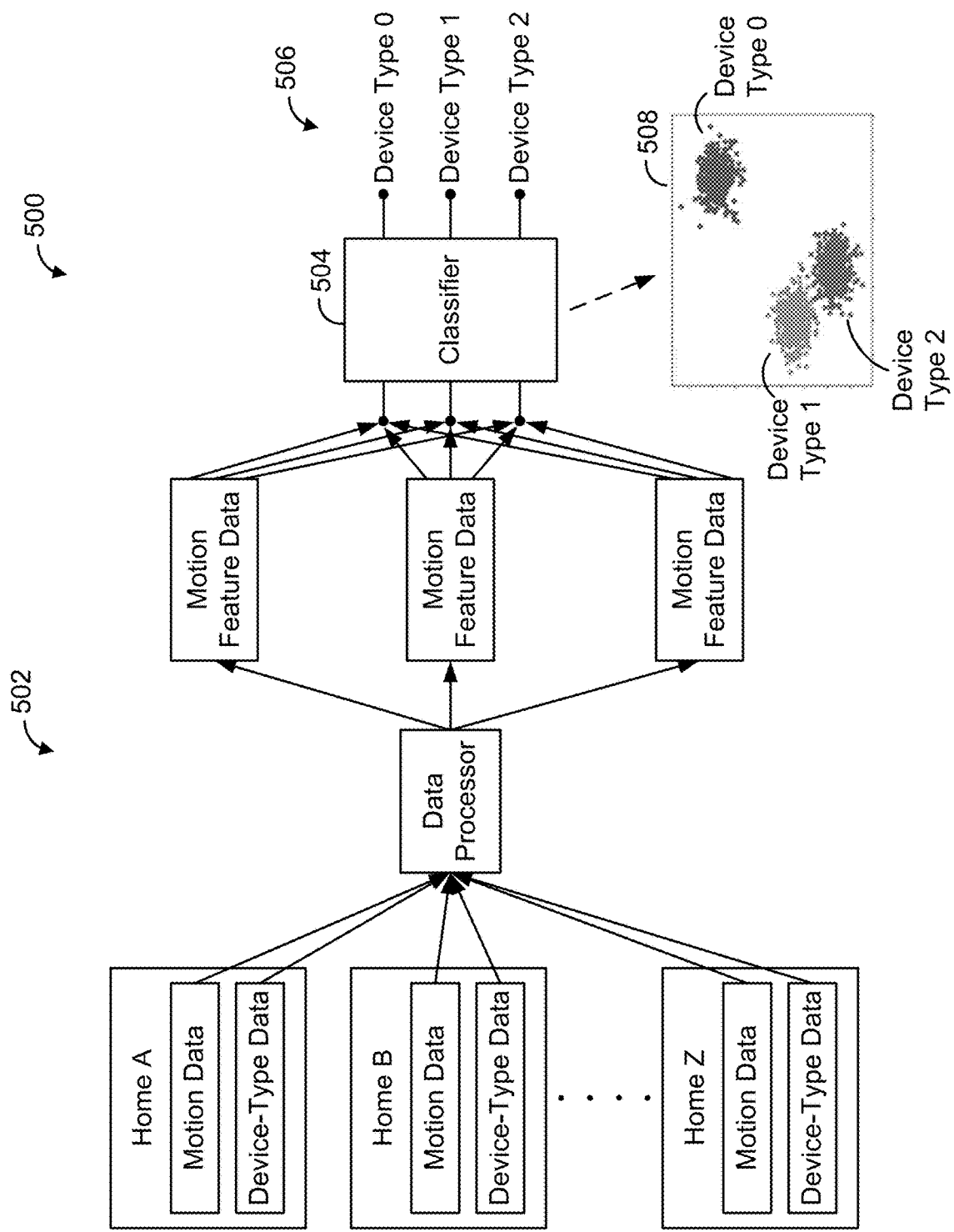
FIG. 5 is a flow chart depicting operations related to training a classifier, according to one example.

FIG. 5 is a flow chart 500 depicting operations related to training a classifier 504, according to one example and in line with the discussion above. As shown, the flow chart includes certain input data 502 provided to a classifier 504, which generates certain output data 506, in line with the discussion above. The flow chart 500 also includes a graph 508, which includes various data points plotted according to certain data values, that fall into one of three clusters, each cluster being associated with a different type of media device (e.g., a television or set-top box remote controller, a video game system controller, or a wearable audio output device). The graph 508 is provided as a visual depiction of how a trained classifier 504 could discriminate among three example types of devices (by determining which cluster a given data point falls within).

In some examples, the process of training the classifier 504 can be a one-time process that is performed once and not repeated. However, in other cases, it may be desirable to periodically re-train the classifier 504 and/or fine tune the trained classifier 504, perhaps based on the availability of additional training data.

Next, responsive to the measurement server 108 providing the obtained motion data to the trained classifier 504, the measurement server 108 can receive from the trained classifier 504, corresponding device type data generated by the trained classifier 504. As such, in the case where the trained classifier 504 was provided with motion data associated with the media device 102 and was trained to discriminate among the device types of a television or set-top box controller, a video game system controller, and a wearable audio output device, the measurement server 108 can receive from the trained classifier 504, device type data that identifies a device type of the media device 102.

The measurement server 108 can then use at least the received device type data to identify a device type of the media device 102. In one example, one set of motion data can be provided to a trained classifier 504, which can generate device type data, and on that basis, the measurement server 108 can identify a type of the media device 102. However, in practice, it might be desirable for that process to be repeated several times, such that the measurement server 108 can performs a verification process in which it consistently confirms the device type (e.g., based on a predetermined number of confirmations over a predetermined time period) before identifying the device type. As such, in one example, the measurement server 108 using at least the received device type data to identify a device type of the media device 102 can involve determining that multiple portions of the received device type data identify the same device type.

The measurement server 108 can then use at least the identified device type of the media device 102 as a basis to select a set of configuration parameters for the motion-detecting device 104. In one example, the measurement server 108 can do this by accessing and using mapping data (e.g., stored in a data-storage unit of, or otherwise accessible to, the measurement server 108) that maps each of multiple types of media devices 102 to a corresponding one of multiple sets of configuration parameters for a motion-detecting device 104 to be mounted to a media device 102 of that type. Such mapping data, including the sets of configuration parameters, can be created and/or edited (e.g., by a user such as a field representative or the like) at various times to suit various desired configurations.

The measurement server 108 can then cause the motion-detecting device 104 to be configured according to the selected set of configuration parameters. The measurement server 108 can do this in various ways. For example, the measurement server 108 can do this by transmitting to the motion-detecting device 104 a set of instructions (e.g., that includes the set of configuration parameters) that cause the motion-detecting device 104 to be configured according to the selected set of configuration parameters.

In another example, the measurement server 108 can do this by transmitting to a configuring device (e.g., the metering device 106) connected to the motion-detecting device 104, a set of instructions that cause the configuring device to cause the motion-detecting device 104 to be configured according to the selected set of configuration parameters. This can be a desirable arrangement in situations in which the measurement server 108 does not have direct communication with the motion-detecting device 104, for example.

The motion-detecting device 104 can now operate in accordance with the selected set of configuration parameters. As such, after the media device 102 has been configured according to the selected set of configuration parameters, the measurement server 108 can obtain additional motion data and/or activity data associated with the motion-detecting device 104, where that additional motion data and/or activity data is provided by the motion-detecting device 104 as it operates according to the new configuration. As discussed above, this can allow the motion-detecting device 104 to itself conduct some on-device data filtering and/or data processing, such that it can more efficiently and effectively generate and transmit motion data and/or activity data for use by the measurement server 108 or another device. In one example, this can allow the motion-detecting device 104 to process motion data on-device and output activity data (e.g., indicating activity on and off events), rather than needing to provide more detailed motion data.

The measurement server 108 can thus use the additional motion data and/or activity data to generate suitable audience measurement reports or the like, or to perform another action (e.g., an action that involves causing the media device 102 and/or the metering device 106 to perform an operation).

In some examples, in connection with the operations discussed above, the motion-detecting device 104 can be configured for operating in one of at least two modes, including an initialization mode (which may also be considered a "high resolution" mode) and a production mode (which may also be considered a "low resolution" mode). While operating in the initialization mode, the motion-detecting device 104 can obtain and/or output motion data associated with the motion-detecting device 104 as described above before the motion-detecting device 104 is configured according to the selected set of configuration parameters. Then, at or around the time the motion-detecting device 104 becomes configured according to the selected set of configuration parameters, the motion-detecting device 104 can switch from operating in the initialization mode to operating in the production mode.

Figure 4:
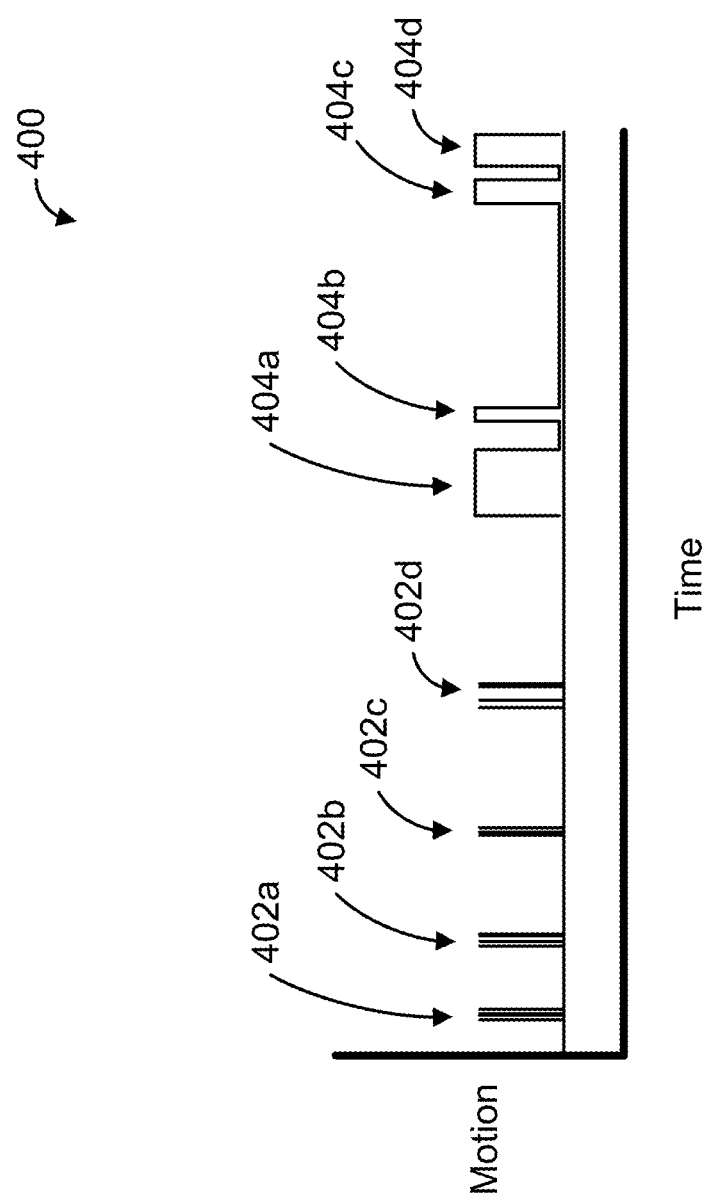
FIG. 4 is a graph of motion data associated with a video game system controller, according to one example.

FIG. 4 depicts a graph 400 of motion data associated with a video game system controller, according to one example, and helps illustrate this concept. As shown in the graph 400, the X-axis represents time and the Y-axis represents motion. In the plot area, the motion data shows how the motion-detecting device of the video game system controller starts by operating in an initialization mode, in which case high-resolution motion data is obtained. This is shown by the four sets of low resolution data 402a, 402b, 402c, and 402d, each representing a respective one of four gaming sessions recorded with high-resolution data. Then, the motion-detecting device of the video game system controller switches and operates in a production mode, in which case low-resolution motion data is obtained. This is shown by the four sets of high-resolution data 404a, 404b, 404c, and 404d, each representing a respective one of four gaming sessions recorded with high-resolution data.

While operating in the production mode, the motion-detecting device 104 can operate according to the selected set of configuration parameters, and thus can obtain and/or output additional motion data and/or activity data in accordance with the selected set of configuration parameters as described above.

In practice, this can allow a measurement company associated with the measurement system 100 to deliver the motion-detecting device 104 to a user, with the motion-detecting device 104 being initially set to the initialization mode. The user can then install the motion-detecting device 104 and have it run in the initialization mode until it completes the steps necessary to then be switched into the production mode as discussed above.

In some cases, even after the motion-detecting device 104 is configured to operate in accordance with the selected set of operational parameters, for a variety of reasons (e.g., the trained classifier 504 has difficulty properly classifying the device type), the motion-detecting device 104 may obtain additional motion data and/or activity data that is inconsistent with what the measurement server 108 expects based on the identified device type. In this case, the measurement server 108 can detect this and can cause the motion-detecting device 104 to re-enter the initialization mode, to repeat the initialization process.

Figure 6:
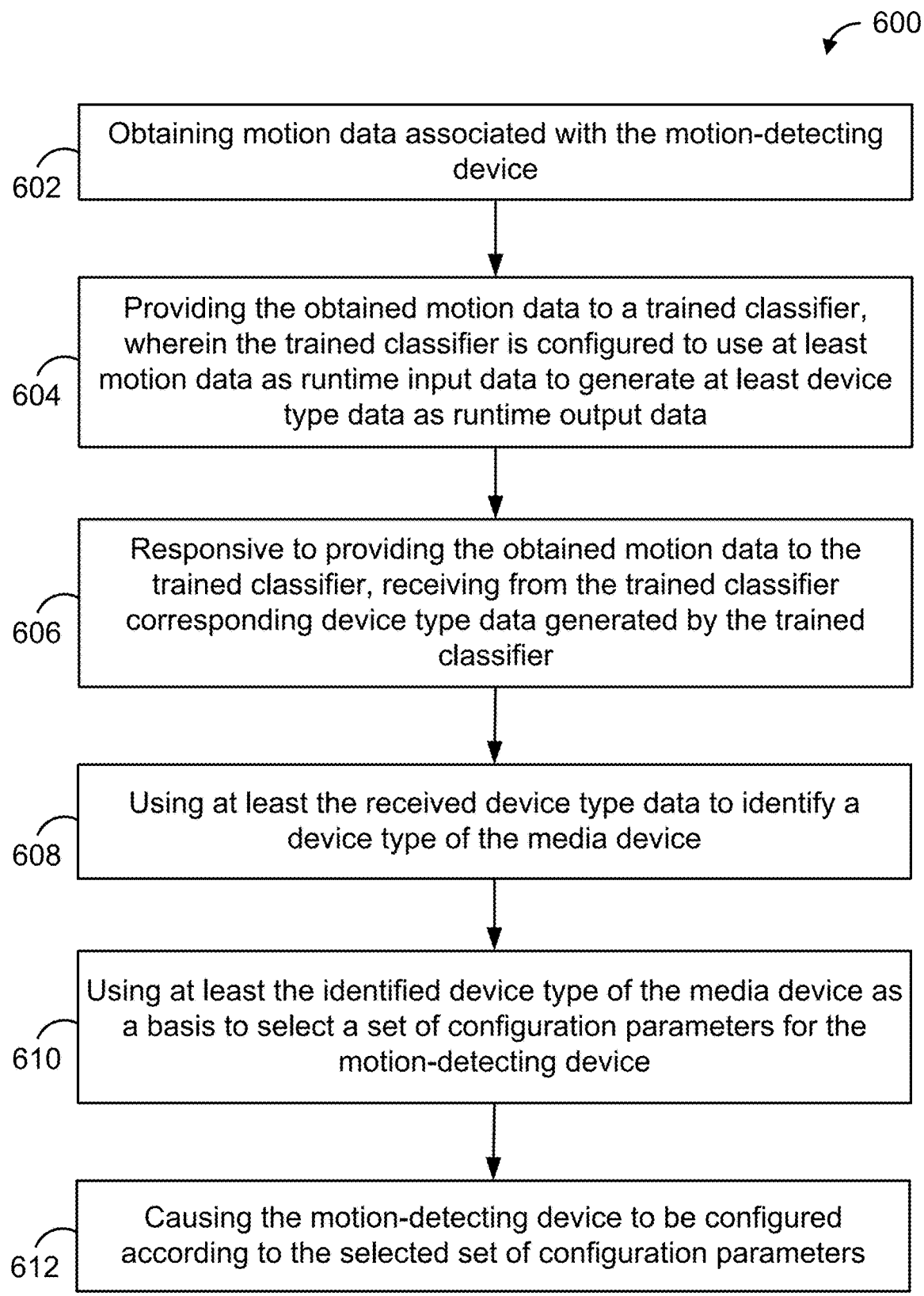
FIG. 6 is a flow chart of an example method.

FIG. 6 is a flow chart illustrating an example method 600. The method 600 can be carried out by a computing system, such as the measurement system 100, or by a component thereof, such as the measurement server 108, or more generally, by a computing system, such as the computing system 200. The method can be for use in connection with a media device (e.g., the media device 102) and a motion-detecting device (e.g., the motion-detecting device 104) mounted to the media device.

At block 602, the method 600 includes obtaining motion data associated with the motion-detecting device. At block 604, the method 600 includes providing the obtained motion data to a trained classifier, wherein the trained classifier is configured to use at least motion data as runtime input data to generate at least device type data as runtime output data. At block 606, the method 600 includes responsive to providing the obtained motion data to the trained classifier, receiving from the trained classifier corresponding device type data generated by the trained classifier. At block 608, the method 600 includes using at least the received device type data to identify a device type of the media device. At block 610, the method 600 includes using at least the identified device type of the media device as a basis to select a set of configuration parameters for the motion-detecting device. At block 612, the method 600 includes causing the motion-detecting device to be configured according to the selected set of configuration parameters.

In some examples, obtaining motion data associated with the motion-detecting device comprises receiving raw motion data from the motion-detecting device, wherein the raw motion data was generated by the motion-detecting device, and wherein the obtained motion data is the received raw motion data.

In some examples, obtaining motion data associated with the motion-detecting device comprises (i) receiving raw motion data from the motion-detecting device, wherein the raw motion data was generated by the motion-detecting device, and (ii) using the received raw motion data to generate motion feature data, wherein the obtained motion data is the generated motion feature data. In some examples, the generated motion feature data represents a motion feature that specifies a duration of an activity pulse. In some examples, the generated motion feature data represents a motion feature that specifies an extent of whether activity pulses are distributed as solitary events as compared to groups of events. In some examples, the generated motion feature data represents a motion feature that specifies an extent of whether activity pulses are distributed over a viewing/listening session regularly as compared to sporadically.

In some examples, the trained classifier was trained with at least motion data as training input data and corresponding device type data as training output data.

In some examples, using at least the received device type data to identify a device type of the media device comprises determining that multiple portions of the received device type data identify the same device type.

In some examples, using at least the identified device type of the media device as a basis to select a set of configuration parameters for the motion-detecting device comprises using mapping data that maps each of multiple device types of media devices to a corresponding one of multiple sets of configuration parameters for the motion-detecting devices.

In some examples, causing the motion-detecting device to be configured according to the selected set of configuration parameters comprises transmitting to the motion-detecting device, a set of instructions that cause the motion-detecting device to be configured according to the selected set of configuration parameters.

In some examples, causing the motion-detecting device to be configured according to the selected set of configuration parameters comprises transmitting to a configuring device connected to the motion-detecting device, a set of instructions that cause the configuring device to cause the motion-detecting device to be configured according to the selected set of configuration parameters.

In some examples, the configuring device is a metering device.

In some examples, the method further comprises: after the motion-detecting device has been configured according to the selected set of configuration parameters, obtaining additional motion data and/or activity data associated with the motion-detecting device; and using the obtained additional motion data and/or activity data to perform an action.

In some examples, the motion-detecting device is configured for operating in one of at least two modes including an initialization mode and a production mode, wherein the obtaining motion data associated with the motion-detecting device occurs while the motion-detecting device operates in the initialization mode, and wherein the method further comprises: after causing the motion-detecting device to be configured according to the selected set of configuration parameters, causing the motion-detecting device to switch from operating in the initialization mode to operating in the production mode.

In some examples, the media device comprises (i) a television or set-top box controller, (ii) a video game system controller, or (iii) a wearable audio output device.

In some examples, the motion-detecting device comprises an accelerometer for obtaining motion data.

In some examples, the motion-detecting device is wirelessly connected to a configuring device.

In some examples, the method further comprises: after causing the motion-detecting device to be configured according to the selected set of configuration parameters, providing supplemental training data to the trained classifier to further train the trained classifier.

IV. Example Variations

Although some of the acts and/or functions described in this disclosure have been described as being performed by a particular entity, the acts and/or functions can be performed by any entity, such as those entities described in this disclosure. For example, some or all operations can be performed server-side and/or client-side. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method for use in connection with a media device and a motion-detecting device mounted to the media device, the method comprising:
   obtaining motion data associated with the motion-detecting device, the motion data being data that represents motion of a device;
   providing the obtained motion data to a trained classifier, wherein the trained classifier is configured to use at least motion data as runtime input data to generate at least device type data as runtime output data, the device type data being data that represents a type of device;
   responsive to providing the obtained motion data to the trained classifier, receiving from the trained classifier corresponding device type data generated by the trained classifier;
   using at least the received device type data to identify a device type of the media device;
   using at least the identified device type of the media device as a basis to select a set of configuration parameters for the motion-detecting device; and
   causing the motion-detecting device to be configured according to the selected set of configuration parameters.

2. The method of claim 1, wherein obtaining motion data associated with the motion-detecting device comprises receiving raw motion data from the motion-detecting device, wherein the raw motion data was generated by the motion-detecting device, and wherein the obtained motion data is the received raw motion data.

3. The method of claim 1, wherein obtaining motion data associated with the motion-detecting device comprises (i) receiving raw motion data from the motion-detecting device, wherein the raw motion data was generated by the motion-detecting device, and (ii) using the received raw motion data to generate motion feature data, wherein the obtained motion data is the generated motion feature data.

4. The method of claim 3, wherein the generated motion feature data represents a motion feature that specifies a duration of an activity pulse.

5. The method of claim 3, wherein the generated motion feature data represents a motion feature that specifies an extent of whether activity pulses are distributed as solitary events as compared to groups of events.

6. The method of claim 3, wherein the generated motion feature data represents a motion feature that specifies an extent of whether activity pulses are distributed over a viewing/listening session regularly as compared to sporadically.

7. The method of claim 1, wherein the trained classifier was trained with at least motion data as training input data and corresponding device type data as training output data.

8. The method of claim 1, wherein using at least the received device type data to identify a device type of the media device comprises:
determining that multiple portions of the received device type data identify the same device type.

9. The method of claim 1, wherein using at least the identified device type of the media device as a basis to select a set of configuration parameters for the motion-detecting device comprises using mapping data that maps each of multiple device types of media devices to a corresponding one of multiple sets of configuration parameters for the motion-detecting devices.

10. The method of claim 1, wherein causing the motion-detecting device to be configured according to the selected set of configuration parameters comprises transmitting to the motion-detecting device, a set of instructions that cause the motion-detecting device to be configured according to the selected set of configuration parameters.

11. The method of claim 1, wherein causing the motion-detecting device to be configured according to the selected set of configuration parameters comprises transmitting to a configuring device connected to the motion-detecting device, a set of instructions that cause the configuring device to cause the motion-detecting device to be configured according to the selected set of configuration parameters.

12. The method of claim 11, wherein the configuring device is a metering device.

13. The method of claim 1, further comprising:
after the motion-detecting device has been configured according to the selected set of configuration parameters, obtaining additional motion data and/or activity data associated with the motion-detecting device; and
using the obtained additional motion data and/or activity data to perform an action.

14. The method of claim 13, wherein the motion-detecting device is configured for operating in one of at least two modes including an initialization mode and a production mode,
wherein the obtaining motion data associated with the motion-detecting device occurs while the motion-detecting device operates in the initialization mode, and wherein the method further comprises:
after causing the motion-detecting device to be configured according to the selected set of configuration parameters, causing the motion-detecting device to switch from operating in the initialization mode to operating in the production mode.

15. The method of claim 1, wherein the media device comprises (i) a television or set-top box controller, (ii) a video game system controller, or (iii) a wearable audio output device.

16. The method of claim 1, wherein the motion-detecting device comprises an accelerometer for obtaining motion data.

17. The method of claim 1, wherein the motion-detecting device is wirelessly connected to a configuring device.

18. The method of claim 1, further comprising:
after causing the motion-detecting device to be configured according to the selected set of configuration parameters, providing supplemental training data to the trained classifier to further train the trained classifier.

19. A computing system comprising a processor and a non-transitory computer-readable medium having stored thereon program instructions that upon execution by the processor, cause performance of a set of acts for use in connection with a media device and a motion-detecting device mounted to the media device, the set of acts comprising:
obtaining motion data associated with the motion-detecting device, the motion data being data that represents motion of a device;
providing the obtained motion data to a trained classifier, wherein the trained classifier is configured to use at least motion data as runtime input data to generate at least device type data as runtime output data, the device type data being data that represents a type of device;
responsive to providing the obtained motion data to the trained classifier, receiving from the trained classifier corresponding device type data generated by the trained classifier;
using at least the received device type data to identify a device type of the media device;
using at least the identified device type of the media device as a basis to select a set of configuration parameters for the motion-detecting device; and
causing the motion-detecting device to be configured according to the selected set of configuration parameters.

20. A non-transitory computer-readable medium having stored thereon program instructions that upon execution by a processor, cause performance of a set of acts for use in connection with a media device and a motion-detecting device mounted to the media device, the set of acts comprising:
obtaining motion data associated with the motion-detecting device, the motion data being data that represents motion of a device;
providing the obtained motion data to a trained classifier, wherein the trained classifier is configured to use at least motion data as runtime input data to generate at least device type data as runtime output data, the device type data being data that represents a type of device;
responsive to providing the obtained motion data to the trained classifier, receiving from the trained classifier corresponding device type data generated by the trained classifier;
using at least the received device type data to identify a device type of the media device;
using at least the identified device type of the media device as a basis to select a set of configuration parameters for the motion-detecting device; and
causing the motion-detecting device to be configured according to the selected set of configuration parameters.

* * * * *